UNITED STATES PATENT OFFICE.

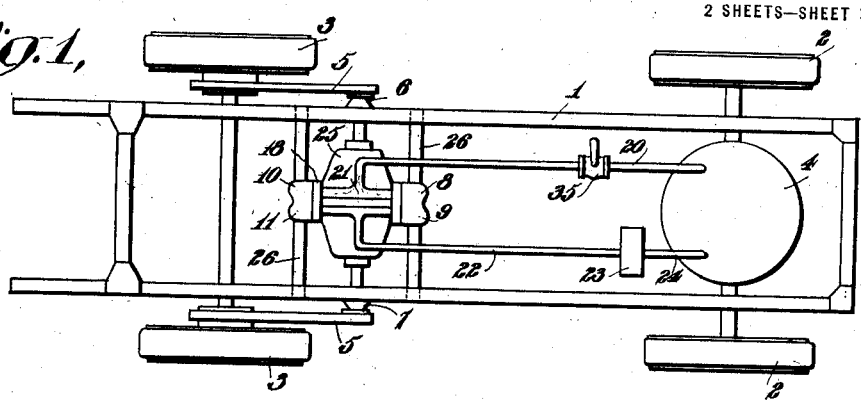
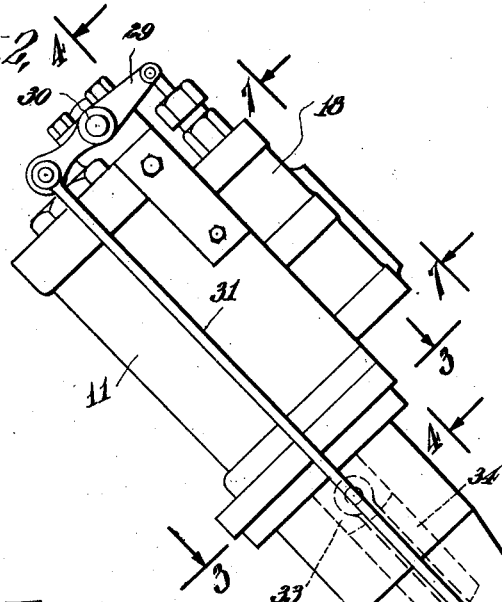
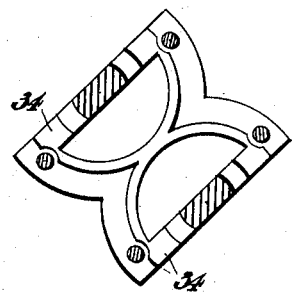

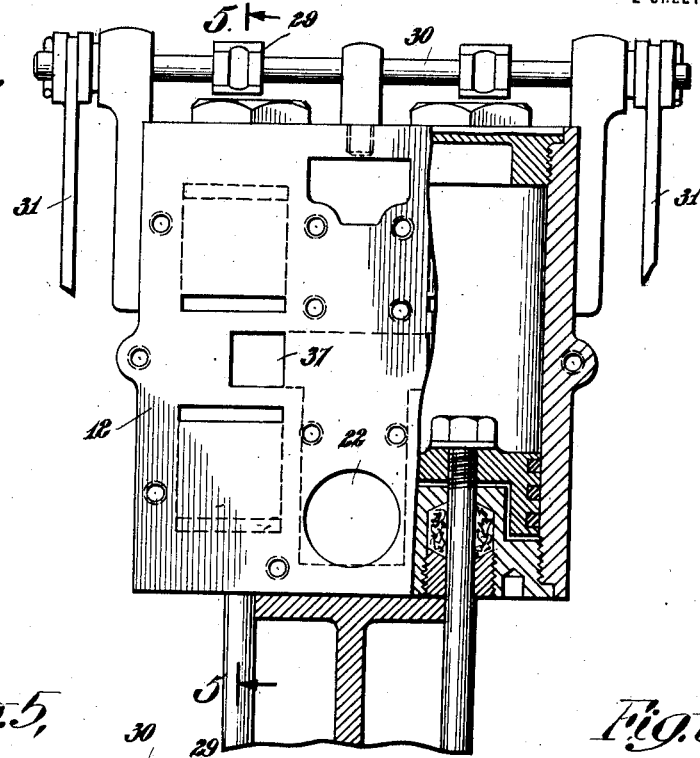
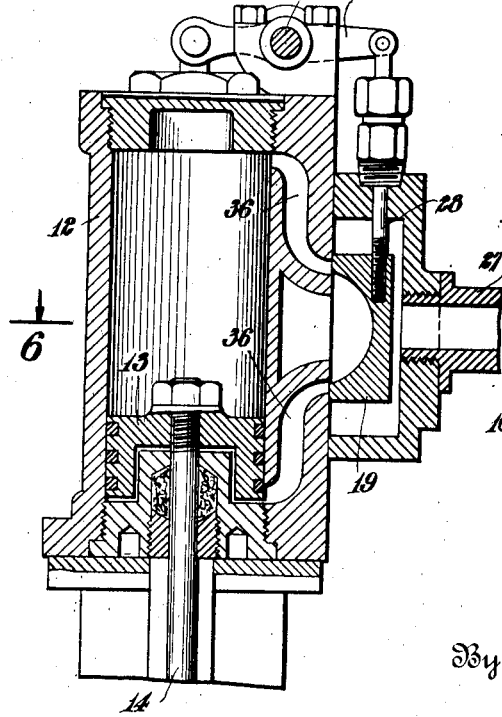
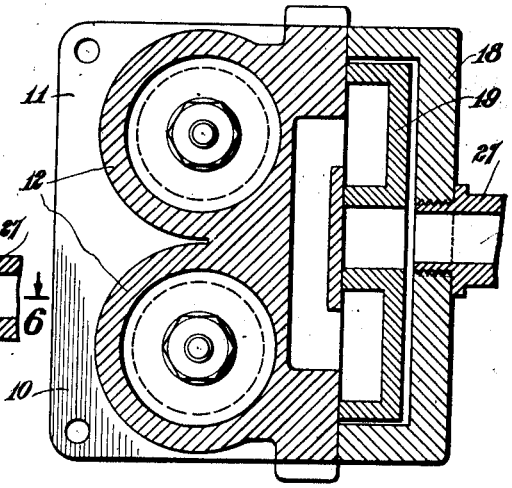

JOSEPH W. PROSSER, OF NEW YORK, N. Y.

MOTOR-VEHICLE DRIVE.

1,339,475.    Specification of Letters Patent.    Patented May 11, 1920.

Application filed August 5, 1919. Serial No. 315,544.

*To all whom it may concern:*

Be it known that I, JOSEPH W. PROSSER, a citizen of the United States, residing in the borough of Manhattan, city, county, and State of New York, have invented certain new and useful Improvements in Motor-Vehicle Drives, of which the following is a specification.

My invention relates to devices whereby a motor vehicle may be driven by steam or air engines or the like in an effective and simple manner and with the elimination of all mechanical differential mechanisms. I accomplish this by driving the rear wheels of the vehicle by means of separate engines connected to the wheels, which engines receive steam or compressed air or the like at equal pressure. A pair of engines may thus be directly connected to separate drive shafts to which the two wheels are connected, these engines having a common steam or air chest by which the motive fluid is received and from which it is taken into the engine cylinders, through appropriate valve mechanism as it may be needed. With this arrangement no auxiliary or additional devices, either mechanical or otherwise, are needed to provide the drive and the differential or equalizing effect which is required for the drive wheels. If the motive power is steam, the same may be generated in a suitable boiler and led by a single supply pipe to the steam chest, under the control of a single throttle valve, and if compressed air is used as the motive fluid a similar arrangement may be used. When the vehicle runs around a curve the required differential effect will be provided by the flow of motive fluid from the common steam or air chest to the cylinders of the respective engines, the wheel at the outside of the curve traveling more rapidly than the wheel at the inner side of the curve, the engine for each wheel taking motive fluid as required by its speed, but at substantially the same pressure as the engine for the other wheel. Similarly, when one of the wheels tends to slip because of decreased friction or for other reason, either in running in a straightforward direction or on a curve, sufficient power may be developed in the engine of the other wheel to drive the vehicle out of the difficulty, sufficient motive fluid being admitted to the steam or air chest to accomplish this purpose.

In the preferred embodiment of my invention a pair of engine cylinders, with their pistons, piston rods and connections, are used in connection with each of the drive shafts of the vehicle, these two cylinders being mounted at an angle to each other so as to obtain the best tractive effect and to obviate dead centers. Preferably, the forward cylinder for one wheel and the forward cylinder for the other wheel are formed in a single casting with a common valve chest, and the rear pair of cylinders are formed in a single casting with a common valve chest. The admission valves for the cylinders may be the usual type of sliding valves, operated from their respective engine shafts. The shafts may be connected to the rear driving wheels in any suitable manner as by means of sprocket chains.

In a broader aspect of my invention, the same may be considered as relating to the operation of a plurality of separate engines, taking motive fluid at the same pressure and under a single control, and operating separate shafts, regardless of the manner in which the power developed is to be utilized.

The objects of my invention accordingly are to provide improved devices and combinations of parts in accordance with the foregoing.

In order that my invention may be more clearly understood, attention is hereby directed to the accompanying drawings forming part of this application and illustrating one embodiment of my invention. In the drawings, Figure 1 represents a plan view of the chassis of a motor vehicle provided with my invention; Fig. 2 represents a partial enlarged side view of a pair of engines connected to drive one shaft; Fig. 3 represents a cross section taken on line 3—3 of Fig. 2; Fig. 4 is a side view of the engine cylinder shown in Fig. 3, with certain parts shown in section, and looking in the direction of the line 4—4 in Fig. 2; Fig. 5 is a section taken on line 5—5 of Fig. 4; Fig. 6 is a cross section taken on line 6—6 of Fig. 5; and Fig. 7 is a side view of the engine looking in the direction of the line 7—7 in Fig. 2.

Referring to the drawings, the chassis 1 of an automobile is represented having front steering wheels 2, 2 and rear traction wheels 3, 3. If the motive fluid is to be steam the boiler 4 of any suitable character may be carried by the chassis. If compressed air is to be used for the motive fluid a suitable arrangement will be used.

The wheels 3, 3 are represented as driven by sprocket chains 5, 5 from short separate alined shafts 6 and 7 which may be suitably supported in the side frames of the chassis.

The shafts 6 and 7 are operated as stated by separate engines having a common source of supply for motive fluid. I will refer to these engines as pneumatic engines, by which term I mean to include engines in which steam or compressed air or the like is used as the motive fluid.

In the preferred arrangement which is illustrated, a pair of engines 8 and 9 are mounted forwardly of the shafts 6 and 7 and a similar pair of engines 10 and 11 are mounted to the rear of shafts 6 and 7. These engines may be and preferably are duplicates. As shown, each of the same may comprise a single cylinder 12 in which a piston 13 is reciprocated by means of a piston rod 14 to which is connected the usual connecting rod 15, which is connected in the usual way to a crank 16 on either the shaft 6 or the shaft 7 as the case may be.

The engines 10 and 8, and engines 11 and 9 respectively are preferably arranged at a suitable angle to each other, such as an angle of 90°, so as to obtain the best tractive effect and to overcome dead centers. With this arrangement, and when each of the engines referred to comprises a single cylinder 12, each of the shafts 6 and 7 may be provided with only a single wrist pin, such as the pin 17 indicated in Fig. 2, to which the connecting rod 15 of engine 11 is connected and also the connecting rod 15' of the other engine 9 of the same fore and aft pair. Similarly, the connecting rods of the engines 10 and 8 may be connected to the wrist pin of the shaft 6.

The forward pair of engines 8 and 9 are preferably made in one casting and the rear pair of engines 10 and 11 in one casting. Each pair of engines 11 and 10 and 9 and 8 is provided with a common steam chest, or chest for the motive fluid, 18, in which operate the intake valves 19, 19 for the respective cylinders, these valves being alike for all cylinders and preferably taking the form of the usual D-slide valves.

The steam or other motive fluid from the boiler or container 4 passes through a supply pipe 20 to a point 21 at which it branches, pipe sections of equal size leading therefrom into the two valve chests or steam chests 18, 18 for the respective engines 8, 9 and 10, 11. Motive fluid flows from these chests by the valves 19 into the respective cylinders. A common return 22 is preferably provided for the exhaust from all four cylinders, this exhaust preferably leading to a condenser diagrammatically represented at 23 (in case steam is the motive power), from which the condensed steam is led by pipe 24 back to the boiler 4. The engines may be provided with a suitable crank case 25 and supported by means of cross members 26, 26 from the side frames of the chassis 1.

The intake passages leading into the valve chests are represented at 27, 27. The intake slide valves may be operated in any suitable manner from the respective engine shafts 6 and 7. As represented, each valve may be moved by a rod 28 connected by a rocker arm 29 mounted on a shaft 30 to a valve rod 31 which derives its motion from an eccentric 32 mounted on the shaft 6 or 7. The cross heads 33 to which the piston rods are connected are guided by cross head guides 34 which may suitably be made in the form indicated. The flow of steam or motive fluid through the supply line 20 may be controlled from any suitable point by means of a throttle valve indicated at 35.

The passages by which the steam or other motive fluid is admitted into the cylinders are indicated at 36, 36. In Fig. 1 the steam intake pipe 20 and the exhaust pipe 22 are represented, for the sake of clearness, as being situated on opposite sides of the construction. In actual practice the exhaust pipe is preferably located under the inlet pipe, as is indicated in Fig. 7. In Fig. 4 the exhaust for any cylinder is represented at 37 communicating with the exhaust pipe 22.

It is believed that the action of the device will now be clear. When the vehicle is running straight ahead, with the requirement of equal traction on the wheels 3, motive fluid is admitted at equal rates to the cylinders 8, 9 and 10, 11, and shafts 6 and 7, and accordingly wheels 3, will rotate at the same speed. When, however, the vehicle goes around a curve, the outside wheel has a longer path to travel and accordingly is free to rotate somewhat more rapidly than the inside wheel. That being the case, motive fluid passes from each valve chest into the cylinders which operate the outside wheel at a suitable rate to maintain the necessary speed of that wheel relative to the inside wheel, the admission valves of the cylinders operating the outside wheel moving in accordance with the speed of the outside wheel. When the vehicle is running straight ahead, and one of the wheels slips, as when, for example, it is in soft mud while the other wheel is on a hard surface, the operator has only to open the throttle somewhat, if necessary. In this case, the cylinders which rotate the slipping wheel can only take enough motive fluid to fill the same and all of the remaining motive fluid will be available for the cylinders which operate the other wheel. Accordingly, that wheel will develop sufficient tractive effort to propel the vehicle regardless of the slipping of the wheel first mentioned. This is in contradistinction to the operation of the mechanical differential mechanisms, in which no greater power can be developed at one wheel than at the other.

It will be observed that the arrangement described of a common valve chest, or a common supply of motive fluid under the same pressure to each of the pair of cylinders which operate separate shafts, constitutes in the case of a motor vehicle, a means for supplying motive fluid to the engines and distributing it between the same, which is automatically responsive only to the required relative speeds of the wheels under different conditions of driving. I do away with all auxiliary or mechanical devices for distributing the motive fluid and thereby not only simplify the construction but render the operation more accurate and responsive to the various conditions to be met. Motive fluid is free at all times to flow from the valve chests to either cylinder connected with each chest. If accordingly the vehicle is going around a curve and the outer wheel slips because of mud or the like, sufficient power may be developed by the inside wheel to drive the vehicle, even though this wheel be moving on a small radius. Such a result cannot be attained when the supply of motive fluid to the engine for the inside wheel is cut down by some auxiliary device in proportion to the steepness of the curve through which the inner wheel travels.

It will also be noted that my invention is not limited in its applicability to the operation of motor vehicles, but that the same may be applied in various cases in which a pair of shafts are to be driven at rates which may vary in accordance with the load. It will also be noted that I provide a plurality of pneumatic engines which operate at equal or approximately equal pressure under a single control and at rates which vary in accordance with the conditions encountered. It will be noted that my invention is not limited to the specific apparatus as described, but is as broad as is indicated by the accompanying claims.

What I claim is:—

1. In apparatus of the character described, the combination of a frame, two independently rotatable traction wheels, driving shafts therefor, a unit comprising two independent pneumatic reciprocating engines, one connected to one of said shafts and the other connected to the other of said shafts to rotate the same, a common chest for supplying motive fluid to said engines, separate valves for said engines, operably mounted in said chest, and means for supplying motive fluid to said chest as desired.

2. In apparatus of the character described, the combination of a frame, two independently rotatable traction wheels, driving shafts therefor, a plurality of pneumatic reciprocating engines, comprising a pair of cylinders the pistons of which are operatively connected to one of said shafts and a pair of cylinders the pistons of which are operatively connected to the other of said shafts, a common chest for supplying motive fluid to one cylinder of the first pair and one cylinder of the second pair, a common chest for supplying motive fluid to the other cylinders of said first and second pairs, separate valves for said cylinders, operatively mounted in said chests, and means for supplying motive fluid to said chests as desired.

3. In apparatus of the character described, the combination of a frame, two independently rotatable traction wheels, driving shafts therefor, a plurality of pneumatic reciprocating engines, comprising a forward and a rear cylinder, the pistons of which are operatively connected to one of said shafts and a forward and rear cylinder the pistons of which are operatively connected to the other of said shafts, the two forward cylinders being formed in a single casting with a common valve chest and the two rear cylinders being formed in a single casting with a common valve chest, separate valves for said cylinders, operatively mounted in said chests, and means for supplying motive fluid to said chests, as desired.

4. In apparatus of the character described, the combination of a frame, a single fixed axle, two independently rotatable traction wheels on said axle, two independent pneumatic reciprocating engines, each having an engine shaft, driving connections between said shafts and wheels, a common chest for supplying motive fluid to said engines, separate valves for said engines, operably mounted in said chest, and means for supplying motive fluid to said chest as desired.

5. In apparatus of the character described, the combination of a frame, two independently rotatable traction wheels, driving shafts therefor, a plurality of pneumatic reciprocating engines, comprising a pair of cylinders the pistons of which are operatively connected to one of said shafts and a pair of cylinders the pistons of which are operatively connected to the other of said shafts, a common chest for supplying motive fluid to one cylinder of the first pair and one cylinder of the second pair, a common chest for supplying motive fluid to the other cylinders of said first and second pairs, separate valves for said cylinders, operatively mounted in said chests, a supply pipe for motive fluid having branch connections to said chests, an exhaust pipe connected to said chests, and a valve in said supply pipe.

This specification signed and witnessed this 11th day of July, 1919.

JOSEPH W. PROSSER.

Witnesses:
DYER SMITH,
I. McINTOSH.